United States Patent
Martin

(10) Patent No.: US 8,947,057 B2
(45) Date of Patent: Feb. 3, 2015

(54) INVERTING BUCK-BOOST USING SINGLE-INDUCTOR BOOST AND CHARGE PUMP WITH A GROUNDED SWITCH

(71) Applicant: Texas Instruments Incorporated, Dallas, TX (US)

(72) Inventor: Alan Dean Martin, San Jose, CA (US)

(73) Assignee: Texas Instruments Incorporated, Dallas, TX (US)

(*) Notice: Subject to any disclaimer, the term of this patent is extended or adjusted under 35 U.S.C. 154(b) by 42 days.

(21) Appl. No.: 13/930,504

(22) Filed: Jun. 28, 2013

(65) Prior Publication Data

US 2014/0002046 A1     Jan. 2, 2014

Related U.S. Application Data

(60) Provisional application No. 61/666,478, filed on Jun. 29, 2012.

(51) Int. Cl.
*H02M 3/156* (2006.01)
*H02M 3/155* (2006.01)
*H02M 3/07* (2006.01)

(52) U.S. Cl.
CPC ............ *H02M 3/156* (2013.01); *H02M 3/155* (2013.01); *H02M 3/07* (2013.01)
USPC .......................................... 323/259; 323/222

(58) Field of Classification Search
USPC ............ 323/222, 232, 282, 288, 344; 363/59, 363/60
See application file for complete search history.

(56) References Cited

U.S. PATENT DOCUMENTS

| | | | | |
|---|---|---|---|---|
| 6,987,379 B2* | 1/2006 | Peron | | 323/225 |
| 8,299,747 B2* | 10/2012 | Hsieh et al. | | 318/800 |
| 8,519,683 B2* | 8/2013 | Asuke et al. | | 323/259 |
| 2008/0157732 A1* | 7/2008 | Williams | | 323/266 |
| 2011/0089920 A1* | 4/2011 | Leong et al. | | 323/283 |

* cited by examiner

Primary Examiner — Gary L Laxton
(74) Attorney, Agent, or Firm — Andrew Viger; Frederick J. Telecky, Jr.

(57) ABSTRACT

The disclosed methodology for buck-boost inverted voltage conversion uses a boost stage coupled to a charge pump stage at a switch node controlled by a transistor switch coupled between the switch node and ground. The boost stage includes a boost inductor coupled between an input supply voltage and the switch node, and the charge pump stage includes a charge pump capacitor coupled between the switch node and a pump node which is coupled to the load and an output capacitor in parallel with the load. The regulated inverted output voltage is supplied to the output capacitor and the load by: (a) in a first phase, switching the transistor switch to conducting to couple the switch node to ground, and thereby (i) transferring energy from a source of input voltage source to the boost inductor, and (ii) transferring energy from a charge pump capacitor to the output node, and (b) in the second phase, switching the transistor switch to non-conducting and clamping the charge pump capacitor at a positive reference voltage, and thereby transferring energy from the boost inductor to the charge pump capacitor. In one embodiment, the positive reference voltage is the input voltage (i.e., during the second phase, the charge pump capacitor is clamped to the input voltage).

11 Claims, 2 Drawing Sheets

US 8,947,057 B2

INVERTING BUCK-BOOST USING SINGLE-INDUCTOR BOOST AND CHARGE PUMP WITH A GROUNDED SWITCH

CROSS REFERENCE TO RELATED APPLICATION

Priority is hereby claimed under USC §119(e) to U.S. Provisional Application 61/666,478, filed Jun. 29, 2012).

BACKGROUND

1. Technical Field

This Patent Document relates generally to switching regulators. More specifically, this disclosure relates to an inverting buck-boost switching regulators.

2. Related Art

Conventional inverting buck-boost regulators include a single inductor coupled to a high-side switch (a switch with a terminal connected to an input voltage rail). High-side switches can be more difficult to fabricate, and are typically implemented using p-type switches, which are less efficient than n-type switches.

Conventional Cuk and flyback converters include a grounded switch (a switch with a terminal connected to ground). However, standard Cuk regulators require multiple inductors or multiple transformer windings, and standard flyback regulators also typically use multiple transformer windings. As a result, conventional Cuk and flyback regulators require more physical space and are more expensive.

SUMMARY

This Brief Summary is provided as a general introduction to the Patent Disclosure provided by the Detailed Description and Figures, and outlines various aspects, features and advantages of the disclosed invention, and should not be interpreted as identifying key elements of the invention, or otherwise delineating the scope of the invention, which is defined by the Claims.

The Disclosure describes apparatus and methods implementing inverted buck-boost conversion based on an inverting buck-boost topology with a single-inductor boost and charge pump with a grounded switch, and thereby supply a regulated voltage to a load by converting an input voltage with a predetermined range into a regulated inverted output voltage with a magnitude greater or less than the magnitude of the input voltage.

In accordance with aspects of the invention, the disclosed Methodology is based on configuring an inverting boost-buck converter topology with a boost stage coupled to a charge pump stage at a switch node controlled by a transistor switch coupled between the switch node and ground, the boost stage including a boost inductor coupled between an input voltage supply and the switch node, and the charge pump stage including a charge pump capacitor coupled between the switch node and a pump node also coupled to the load and an output capacitor in parallel with the load. The Methodology includes supplying the regulated inverted output voltage to the output capacitor and the load by: (a) in a first phase, switching the transistor switch to conducting to couple the switch node to ground, and thereby (i) transferring energy from the input voltage supply to the boost inductor, and (ii) transferring energy from the charge pump capacitor to the output node, and (b) in the second phase, switching the transistor switch to non-conducting and clamping (or bounding) the charge pump capacitor at a positive reference voltage, and thereby transferring energy from the boost inductor to the charge pump capacitor. In one embodiment, the positive reference voltage is the input voltage (i.e., during the second phase, the charge pump capacitor is clamped to the input voltage).

Other aspects, features and advantages of the claimed invention will be apparent to those skilled in the art from the following Disclosure.

DETAILED DESCRIPTION

This Description and the Figures disclose example embodiments and applications that illustrate various aspects, features and advantages of the invention defined by the Claims. Known circuits, functions and operations are not described in detail to avoid unnecessarily obscuring the principles and features of the claimed invention.

In Brief overview, according to aspects of the claimed invention, embodiments of an inverting buck-boost converter with a single inductor boost and charge pump with a grounded switch can include: (a) a boost stage including a boost inductor (typically external) coupled between a source of the input voltage and a switch node; (b) a charge pump stage including a charge pump capacitor and a charge transfer network (such as a diode or equivalent active switch network), the charge pump capacitor coupled between the switch node and a pump node, and the charge transfer network configured to couple the pump node to (i) an output node coupled to an output capacitor (typically external) in parallel with a load, and (ii) a positive voltage reference. Switching circuitry can include either a transistor switch coupled between the switch node and ground, or circuitry configured to couple an external transistor switch from the switch node to ground. To supply the regulated inverted output voltage to the output capacitor and the load, the switching circuitry can be configured to switch between: (a) a first phase in which the transistor switch conducts to connect the switch node to ground, and (b) a second phase in which the transistor switch is non-conducting to disconnect the switch node from ground, such that (i) in the first phase, energy can be transferred to the boost inductor from the input voltage source, and energy can be transferred from the charge pump capacitor through the charge transfer network to the output node, and (ii) in the second phase, energy can be transferred from the boost inductor to the charge pump capacitor which is clamped by the charge transfer network to the positive reference voltage.

Figure 1:
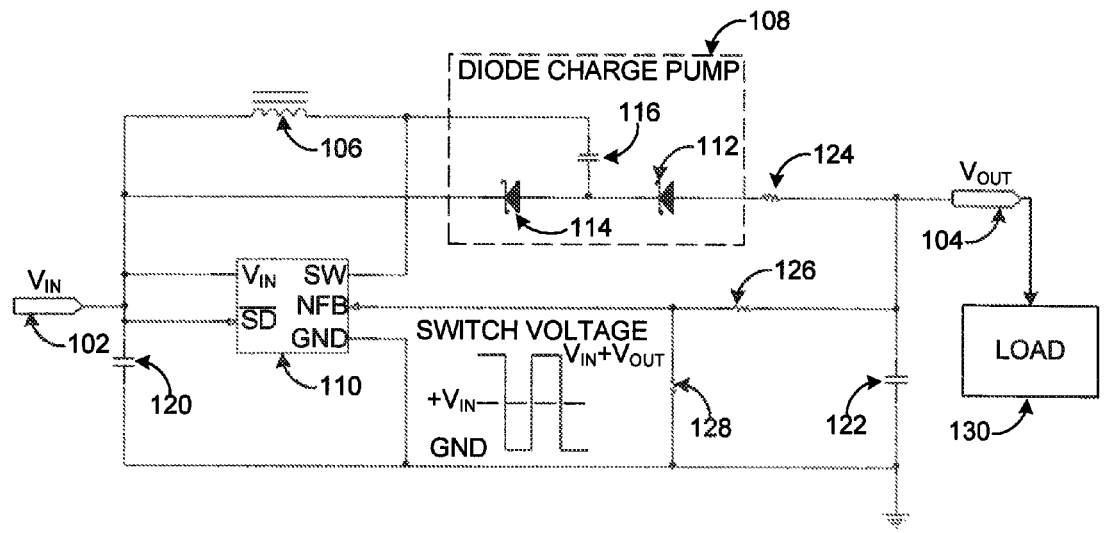
FIG. 1 illustrates an example switching regulator using an inverting buck-boost topology with a single-inductor boost and charge pump with a grounded switch according to this disclosure.

FIG. 1 illustrates an example switching regulator 100 using an inverting buck-boost topology with a single-inductor boost and charge pump with a grounded switch according to this disclosure. As shown in FIG. 1, the switching regulator 100 receives an input voltage $V_{IN}$ at an input terminal 102 and generates a regulated output voltage $V_{OUT}$ at an output terminal 104. Because the switching regulator 100 uses an inverting topology, the output voltage $V_{OUT}$ has an inverted polarity compared to the input voltage $V_{IN}$. However, unlike conventional regulators with grounded switches where the magnitude of the output voltage is greater than the magnitude of the input voltage, the magnitude of the output voltage $V_{OUT}$ in FIG. 1 can be higher or lower than the magnitude of the input voltage $V_{IN}$. Each terminal 102-104 includes any suitable structure for receiving or providing a signal.

As shown in FIG. 1, the switching regulator 100 includes an inductor 106, a diode charge pump 108, and a switching circuit 110. The inductor 106 is coupled between the input terminal 102 and the charge pump 108. The inductor 106 includes any suitable inductive structure having any suitable inductance. In particular embodiments, the inductor 106 represents a 10 μH inductor, such as a D01608C-103MLB surface mount power inductor from COILCRAFT, INC. In particular embodiments, the diode charge pump can be implemented with an equivalent active switch network.

The charge pump 108 is coupled to the input terminal 102, the inductor 106, and the output terminal 104. The charge pump 108 operates to generate the output voltage $V_{OUT}$. In this example, the charge pump 108 includes a charge pump capacitor 116, and a charge transfer network including two Schottky diodes 112-114. The diodes (or equivalent active switches) implement charge transfer control at a charge pump node at one end to the charge pump capacitor 116, with diode 112 controlling charge transfer between the charge pump capacitor/node and the output node 104, and diode 114 coupling (clamping) the charge pump capacitor/node to $V_{IN}$ (input terminal 102). The capacitor 116 is coupled to the inductor 106 and to the charge pump node between the diodes 112-114. Diodes 112-114 represent any suitable diodes, such as B130-13-F 1A 30V Schottky diodes from DIODES INC. In some embodiments, both diodes 112-114 could reside within a single package. The use of Schottky diodes is a design choice to improve efficiency—in other embodiments, other diodes or equivalent active switches can be used. The capacitor 116 includes any suitable capacitive structure having any suitable capacitance. In particular embodiments, the capacitor 116 represents a 10 μF capacitor.

The switching circuit 110 selectively couples the inductor 106 and the charge pump 108 to ground. In this example, the switching circuit 110 represents an integrated circuit chip having multiple pins. An SW pin is coupled to a node between the inductor 106 and the charge pump 108. The switching circuit 110 operates to selectively couple the SW pin to a GND pin in order to couple the inductor 106 and the charge pump 108 to ground. The switching circuit 110 can also selectively decouple the SW pin from the GND pin, which allows energy transfer between the inductor 106 and the charge pump 108 to occur. A negative feedback (NFB) pin of the switching circuit 110 allows the switching circuit 110 to operate using feedback based on the output voltage $V_{OUT}$. A VIN pin of the switching circuit 110 receives the input voltage $V_{IN}$, and a shutdown (SD) pin can receive a shutdown signal. In this case, the shutdown signal represents the input voltage $V_{IN}$, so the switching circuit 110 is enabled when the input voltage $V_{IN}$ reaches an adequate level. The switching circuit 110 includes any suitable structure for selectively coupling an inductor and charge pump to ground. In particular embodiments, the switching circuit 110 represents an LM2611AMF DC/DC switching regulator or the LM3481 DC/DC switching controller (external power switch) from TEXAS INSTRUMENTS INC.

An input capacitor 120 and an output capacitor 122 can be used to smooth variations in the input and output voltages, respectively. Each capacitor 120-122 includes any suitable capacitive structure having any suitable capacitance. In particular embodiments, each capacitor 120-122 represents a 10 μF 16V capacitor.

Various resistors 124-128 are also shown in FIG. 1. The resistor 124 represents an output resistance and can be a small value, such as 1Ω. The resistors 126-128 form a voltage divider that divides the output voltage $V_{OUT}$ and creates a feedback voltage for the NFB pin of the switching circuit 110. Each of the resistors 126-128 could have any suitable resistance depending on the desired divider functionality. In particular embodiments, the resistor 126 represents a 29.4 kΩ resistor, and the resistor 128 represents a 10 kΩ resistor.

In conventional inverting buck-boost regulators, a high-side switch would typically output a signal that oscillates between the input voltage and the output voltage (which have opposite polarities). As noted above, however, high-side switches suffer from various drawbacks. In conventional boost, Cuk, and flyback regulators, grounded switches can be used, but these topologies are non-inverting, including a charge pump that stores peak to peak switch voltage.

In FIG. 1, the switching regulator 100 uses a low-side or grounded switch (implemented within the switching circuit 110). The switch is grounded since one terminal of the switch is connected to ground, and the switch has no terminal connected directly to the input voltage $V_{IN}$. Moreover, a single inductor can be used in the switching regulator 100, which helps to reduce the size and cost of the switching regulator 100 (compared to those that use multiple inductors or transformer windings). In this configuration, the voltage present on the SW pin of the switching circuit 110 may remain at or above ground. This is because the charge pump 108 is referenced to the input voltage $V_{IN}$, rather than ground. Referencing the charge pump to the input voltage $V_{IN}$ rather than ground results in a lower voltage drop across the capacitor 116. It also means that all pins of the switching circuit 110 remain at or above ground potential. As a design choice, charge pump 108 can be referenced to a selected positive reference voltage other than $V_{IN}$.

In this way, the switching regulator 100 allows the generation of an inverted output voltage $V_{OUT}$ with a magnitude that can be larger or smaller than the magnitude of the input voltage $V_{IN}$ using a single inductor and a grounded switch. As a result, the switching regulator 100 can be smaller than conventional regulators like flyback and Cuk regulators. Moreover, a grounded switch is typically more efficient in operation than high-side switches and is easier to implement in silicon.

In this example, the output voltage $V_{OUT}$ is provided to a load 130. The load 130 represents any suitable device or system that operates using a regulated output voltage $V_{OUT}$. The switching regulator 100 can be used in any suitable application that involves voltage regulation. For example, the load 130 could represent a magneto-resistive (MR) read channel of a hard disk drive. Additional applications could include industrial or other applications where a regulated negative output voltage is generated using a positive input voltage rail. In particular embodiments, the input voltage $V_{IN}$ could be between about +2.7V and about +14V, and the output voltage $V_{OUT}$ could be about −5V at about 200 mA. The switching regulator 100 could be used in any other suitable device or system.

In particular embodiments, various components in FIG. 1 could be implemented within a single integrated circuit chip. For example, all components shown in FIG. 1 except for the inductor, capacitors, and load could be implemented using a single integrated circuit chip. In these embodiments, the integrated circuit chip could include input/output pins, bond pads, or other structures for coupling to the inductor, capacitors, and load. In other embodiments, however, any of the inductor, capacitors, and load could be integrated within the integrated circuit chip.

Although FIG. 1 illustrates one example of a switching regulator 100 using an inverting buck-boost topology with a single-inductor boost and charge pump with a grounded switch, various changes may be made to FIG. 1. For example, while the example embodiment is an inverting buck-boost topology, a non-inverting buck-boost topology can be implemented based on a single inductor boost followed by a charge pump that is referenced not to ground but to a reference voltage such as $V_{IN}$—design modifications that would be required for the non-inverting topology include an additional charge pump also referenced to a reference voltage, such as $V_{IN}$ or $-V_{OUT}$. Also, all numerical component values given above (such as resistances, inductances, capacitances, voltages, and currents) are approximate values only. Also, components shown in FIG. 1 could be replaced by other components that perform the same or similar function. As a particular example, any suitable switch and switch control circuitry could be used in the switching circuit 110.

Figure 2:
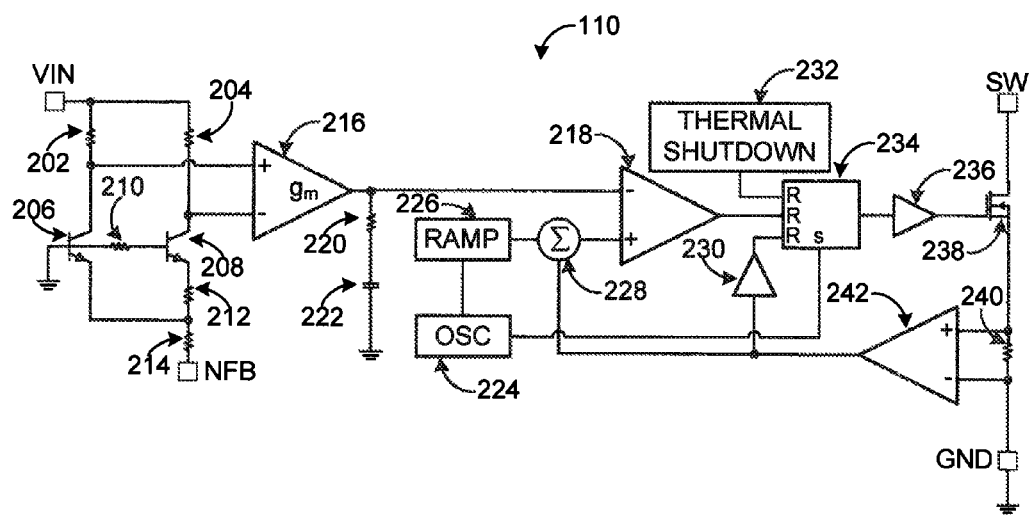
FIG. 2 illustrates an example switching circuit in the switching regulator of FIG. 1 according to this disclosure.

FIG. 2 illustrates an example switching circuit 110 in the switching regulator 100 of FIG. 1 according to this disclosure. As shown in FIG. 2, the input voltage $V_{IN}$ is received at the VIN pin of the switching circuit 110 and is provided to two resistors 202-204. The resistors 202-204 are coupled to bipolar transistors 206-208, respectively. The bipolar transistors 206-208 could have different sizes, such as when the bipolar transistor 208 is ten times larger than the bipolar transistor 206. A base of the bipolar transistor 206 is coupled to ground, and a base of the bipolar transistor 208 is coupled to ground via a resistor 210. Two resistors 212-214 are coupled between the bipolar transistor 208 and the feedback pin NFB, while the resistor 214 is coupled between the bipolar transistor 206 and the feedback pin NFB. In particular embodiments, the resistor 212 represents a 30 kΩ resistor, while the resistor 214 represents a 140 kΩ resistor.

A transconductance ($g_m$) amplifier 216 has a first input coupled to the resistor 202 and transistor 206 and a second input coupled to the resistor 204 and transistor 208. The transconductance amplifier 216 generates an output current that is proportional to the voltage difference between its inputs. The output current is provided to the inverting input of a pulse width modulation (PWM) comparator 218. A resistor 220 is coupled to the output of the amplifier 216 and the inverting input of the comparator 218, and a capacitor 222 is coupled between the resistor 220 and ground.

An oscillator 224 generates a clock signal, such as a 1.4 MHz clock signal. A ramp generator 226 uses the clock signal to generate a ramp signal that repeatedly increases until hitting a maximum value, at which point the ramp signal is reset to a lower value. A combiner 228 combines the ramp signal with feedback and provides the combined signal to the non-inverting input of the comparator 218. An output of the comparator 218, an output of a current limit comparator 230, and an output from a thermal shutdown unit 232 are provided as different reset signals to an S-R latch 234. The set input of the latch 234 is coupled to the oscillator 224. An output of the latch 234 is coupled to a gate driver 236, which drives the gate of a transistor 238. In this example, the transistor 238 represents an n-type MOSFET transistor.

The feedback is generated using a sense resistor 240 and a differential amplifier 242. The sense resistor 240 generates a voltage based on a current flowing through the transistor 238. The resistor 240 could have a small resistance, such as 0.050, to help reduce or minimize power dissipation. The amplifier 242 amplifies the voltage drop across the sense resistor 240 to generate the feedback, which is provided to the combiner 228 and the current limit comparator 230.

In this example, the transistor 238 implements the switch in the switching circuit 110 that selectively couples the SW pin to ground. The transistor 238 therefore selectively couples the inductor 106 and the charge pump 108 to ground as shown in FIG. 1. The other components in FIG. 2 operate to control the switching of the transistor 238 in order to maintain the output voltage $V_{OUT}$ in regulation. For instance, these components can alter the duty cycle of the drive signal provided to the transistor 238 in order to vary the amount of time that the inductor 106 and the charge pump 108 are coupled to ground.

During operation, the switching circuit 110 repeatedly activates and deactivates the transistor 238. When the transistor 238 is activated (conductive), the inductor 106 is coupled to ground, and essentially the entire input voltage $V_{IN}$ appears across the inductor 106. During this time, the diodes 112-114 are (ideally) non-conducting, and the inductor 106 is charged.

When the transistor 238 is deactivated (non-conductive), the inductor 106 transfers energy to the capacitor 116 in the charge pump 108. However, because the diode 114 is coupled to the input terminal 102 instead of to ground, the charge pump 108 is referenced to the input voltage $V_{IN}$. As a result, the voltage difference across the capacitor 116 is generally equal to the boosted voltage provided by the inductor 106. As such, the inverted output potential captures only the boosted inductor voltage, rather than the full peak-to-peak voltage on the SW pin. This allows the inverted output voltage $V_{OUT}$ to have a smaller magnitude than the input voltage $V_{IN}$ if desired (note that the inverted output voltage $V_{OUT}$ could also have a larger magnitude than the input voltage $V_{IN}$ if desired). In effect, the switching regulator 100 can buck or boost the input voltage $V_{IN}$ to obtain the desired output voltage $V_{OUT}$. This is typically not possible using a single inductor and a grounded switch.

Although FIG. 2 illustrates one example of the switching circuit 110 in the switching regulator 100 of FIG. 1, various changes may be made to FIG. 2. For example, each component shown in FIG. 2 could be implemented using any suitable circuitry. Also, FIG. 2 represents one possible implementation of the switching circuit 110, although other implementations could also be used in the switching regulator 100 of FIG. 1.

Figure 3:
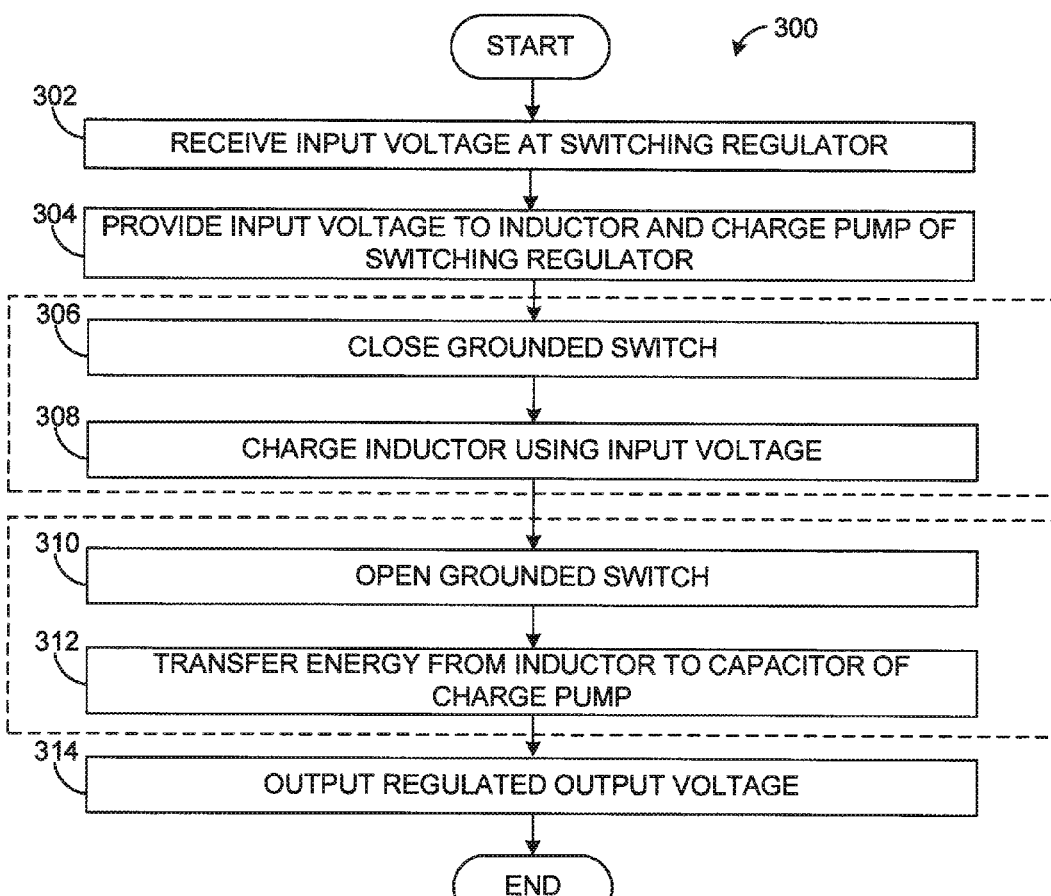
FIG. 3 illustrates an example method for operating an inverting buck-boost switching regulator using a single-inductor boost and charge pump with a grounded switch according to this disclosure.

FIG. 3 illustrates an example method 300 for operating a switching regulator using an inverting buck-boost topology with a single-inductor boost and charge pump with a grounded switch according to this disclosure. For ease of explanation, the method 300 is described with respect to the switching regulator 100 of FIG. 1 that uses the switching circuit 110 of FIG. 2. The method 300 could be performed using any other suitable device or system.

As shown in FIG. 3, an input voltage is received at a switching regulator at step 302. This could include, for example, receiving a positive input voltage $V_{IN}$ on the input terminal 102 from an input voltage rail. In particular embodiments, the input voltage $V_{IN}$ is between about +2.7V and about −14V. The input voltage is input to the inductor 106 at step 304.

The switching regulator is operated in two phases of a repeating switching cycle. In one phase, a grounded switch is closed at step 306, grounding both the inductor 106, and one end of the charge pump capacitor 116 at step 308. During this phase, energy is transferred from $V_{IN}$ into the grounded inductor 106, and energy is transferred from the grounded charge pump capacitor to output capacitor 122 and output terminal 104.

In another phase, the grounded switch is opened at step 310, and energy is transferred from the inductor to the charge pump capacitor 116 at step 312. This could include, for example, deactivating the transistor 238 to decouple the inductor 106 from ground, and transferring energy from the inductor 106 to the capacitor 116 in the charge pump 108. Since the charge pump capacitor 116 is referenced (clamped) to the positive input voltage $V_{IN}$, the energy transferred from the inductor 106 to the capacitor 116 represents only the boosted inductor voltage, not the entire voltage swing between the positive input voltage and an inverted (negative) output voltage.

As a result, a regulated output voltage is provided at step 314. This could include, for example, the charge pump 108 generating a negative output voltage $V_{OUT}$ on the output terminal 104, with the output capacitor 122 smoothing variations in the negative output voltage $V_{OUT}$ caused by (among other things) switching operations of the transistor 238. In particular embodiments, the output voltage $V_{OUT}$ is about −5V with a current of about 200 mA.

Although FIG. 3 illustrates one example of a method 300 for operating a switching regulator using an inverting buck-boost topology with a single-inductor boost and charge pump with a grounded switch, various changes may be made to FIG. 3. For example, while shown as a series of steps, various steps in FIG. 3 could overlap, occur in parallel, occur in a different order, or occur any number of times.

This Description of example embodiments and applications illustrates various aspects, features and advantages of the invention. The example embodiments and applications may be used by those skilled in the art as a basis for modifications, substitutions and alternatives to design other embodiments, including adaptations for other applications, that also embody the features and advantages, and employ the methodology, of the invention. Accordingly, this Description does not limit the scope of the invention, which is defined by the Claims.

The invention claimed is:

1. An inverting buck-boost converter for supplying a regulated voltage to a load by converting a positive input voltage with a predetermined range into a regulated inverted output voltage with a magnitude greater or less than the magnitude of the input voltage, the inverting buck-boost converter operable with a boost inductor and an output capacitor coupled in parallel with the load, the inverting buck-boost converter comprising:
a boost stage including the boost inductor coupled between a source of the input voltage and a switch node;
a charge pump stage including a charge pump capacitor and a charge transfer network, the charge pump capacitor coupled between the switch node and a pump node, which is coupled by the charge transfer network to (i) an output node coupled to the output capacitor, and (ii) a positive voltage reference; and
switching circuitry including one of (i) a transistor switch coupled between the switch node and ground, and (ii) circuitry configured to couple a transistor switch from the switch node to ground;
the switching circuitry configured to switch between a first phase in which the transistor switch conducts to connect the switch node to ground, and a second phase in which the transistor switch is non-conducting to disconnect the switch node from ground, and
the switching circuitry (i) operable in the first phase, to transfer energy to the grounded boost inductor from the input voltage source, and to transfer energy from the grounded charge pump capacitor through the charge transfer network to the output node, and (ii) operable in the second phase, to transfer energy from the boost inductor to the charge pump capacitor which is clamped at the pump node to the reference voltage by the charge transfer network;
such that the inverting buck-boost converter is operable to supply the regulated inverted output voltage to the output capacitor and the load.

2. The inverting buck-boost converter of claim 1, wherein the pump node is coupled through the charge transfer network to the input voltage source, such that the positive reference voltage is the input voltage.

3. The inverting buck-boost converter of claim 1, wherein the charge transfer network comprises a diode network including a first diode coupled between the pump node and the output node, and a second diode coupled between the pump node and the positive voltage reference.

4. The inverting buck-boost converter of claim 1, wherein the switching circuitry controls switching between the first and second phases based on constant frequency, peak current mode control.

5. A system for supplying a regulated inverted voltage to a load, where the regulated inverted voltage has a magnitude greater or less than the magnitude of an input voltage with a predetermined positive range of voltages, comprising:
a supply of the input voltage;
a boost stage including a boost inductor coupled between a source of the input voltage and a switch node;
a charge pump stage including a charge pump capacitor and a charge transfer network, the charge pump capacitor coupled between the switch node and a pump node, which is coupled by the charge transfer network to an output node coupled, and a positive voltage reference;
an output capacitor coupled to the output node in parallel with the load; and
switching circuitry including one of (i) a transistor switch coupled between the switch node and ground, and (ii) circuitry configured to couple a transistor switch from the switch node to ground;
the switching circuitry configured to switch between a first phase in which the transistor switch conducts to connect the switch node to ground, and a second phase in which the transistor switch is non-conducting to disconnect the switch node from ground, and
the switching circuitry (i) operable in the first phase, to transfer energy to the grounded boost inductor from the input voltage source, and to transfer energy from the grounded charge pump capacitor through the charge transfer network to the output node, and (ii) operable in the second phase, to transfer energy from the boost inductor to the charge pump capacitor which is clamped at the pump node to the reference voltage by the charge transfer network;
thereby enabling a regulated inverted output voltage to be supplied to the output capacitor and the load.

6. The system of claim 5, wherein the pump node is coupled through the charge transfer network to the input voltage source, such that the positive reference voltage is the input voltage.

7. The system of claim 5, wherein the charge transfer network comprises a diode network including a first diode coupled between the pump node and the output node, and a second diode coupled between the pump node and the positive voltage reference.

8. The system of claim 5, wherein the switching circuitry controls switching between the first and second phases based on constant frequency, peak current mode control.

9. A method for supplying a regulated voltage to a load by converting an input voltage with a predetermined range into a regulated inverted output voltage with a magnitude greater or less than the magnitude of the input voltage, comprising:
- configuring an inverting boost-buck converter topology with a boost stage coupled to a charge pump stage at a switch node controlled by a transistor switch coupled between the switch node and ground, the boost stage including a boost inductor coupled between an input voltage supply and the switch node, and the charge pump stage including a charge pump capacitor coupled between the switch node and a pump node which is coupled to the load and an output capacitor in parallel with the load; and
- in a first phase, switching the transistor switch conducting to couple the switch node to ground, and thereby (i) transferring energy from the input voltage supply to the boost inductor, and (ii) transferring energy from the charge pump capacitor to the output node, and
- in a second phase, switching the transistor switch to non-conducting (decoupling the switch node from ground), and clamping the charge pump capacitor to a reference voltage, and thereby transferring energy from the boost inductor to the charge pump capacitor;
- thereby enabling the regulated inverted output voltage to be supplied to the output capacitor and the load.

10. The method of claim 9, wherein the positive reference voltage is the input voltage.

11. The method of claim 1, wherein switching between the first and second phases is based on constant frequency, peak current mode control.

* * * * *